United States Patent
Goudarzi et al.

(10) Patent No.: US 11,029,780 B1
(45) Date of Patent: Jun. 8, 2021

(54) DYNAMIC RESCAN TO REDUCE LANDING ARTIFACTS

(71) Applicant: SYNAPTICS INCORPORATED, San Jose, CA (US)

(72) Inventors: Katayoun Goudarzi, Los Gatos, CA (US); Tracy Scott Dattalo, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/938,775

(22) Filed: Jul. 24, 2020

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0418; G06F 3/0446
See application file for complete search history.

(56) References Cited

U.S. PATENT DOCUMENTS

| | | | | |
|---|---|---|---|---|
| 9,164,641 B1* | 10/2015 | Rowe | .................. | G06F 3/04184 |
| 9,274,659 B2* | 3/2016 | Tanemura | ............. | G06F 3/0446 |
| 9,772,725 B2* | 9/2017 | Schwartz | ............. | G06F 1/3262 |
| 2012/0013564 A1* | 1/2012 | Westhues | ............ | G06F 3/04182 |
| | | | | 345/174 |
| 2013/0215047 A1* | 8/2013 | Wu | ........................ | G06F 3/0418 |
| | | | | 345/173 |
| 2014/0049501 A1* | 2/2014 | Santos | ................... | G06F 3/0418 |
| | | | | 345/174 |
| 2014/0049507 A1* | 2/2014 | Shepelev | ............ | G06F 3/04184 |
| | | | | 345/174 |
| 2014/0125623 A1* | 5/2014 | Atkinson | ............... | G06F 3/0418 |
| | | | | 345/174 |
| 2015/0091838 A1* | 4/2015 | Tanemura | ............. | G06F 3/0446 |
| | | | | 345/174 |
| 2015/0109217 A1* | 4/2015 | Zhu | ........................ | G06F 3/041 |
| | | | | 345/173 |
| 2015/0378495 A1* | 12/2015 | Losh | ..................... | G06F 3/0446 |
| | | | | 345/174 |
| 2016/0062533 A1* | 3/2016 | O'Connor | ........... | G06F 3/04186 |
| | | | | 345/173 |
| 2016/0085335 A1* | 3/2016 | Schwartz | ............. | G06F 1/3262 |
| | | | | 345/174 |
| 2016/0092010 A1* | 3/2016 | Agarwal | .................. | G09G 5/12 |
| | | | | 345/173 |
| 2016/0162011 A1* | 6/2016 | Verma | ............... | G06F 3/041661 |
| | | | | 345/173 |
| 2016/0259467 A1* | 9/2016 | Nayyar | ................. | G06F 1/3262 |

(Continued)

*Primary Examiner* — Amy Onyekaba
(74) *Attorney, Agent, or Firm* — Paradice & Li LLP

(57) ABSTRACT

A method and apparatus for dynamically rescanning an array of sensor electrodes of an input device. The input device performs a first scan of the array over a plurality of iterations to acquire a frame of sensor data, where a different subframe of the sensor data is acquired from each iteration of the first scan. During each iteration of the first scan, the input device compares the subframe of sensor data acquired from the iteration with a respective subframe of sensor data acquired prior to the iteration. In some implementations, the input device may selectively repeat one or more iterations of the first scan based on the comparison.

20 Claims, 9 Drawing Sheets

(56) References Cited

U.S. PATENT DOCUMENTS

| | | | |
|---|---|---|---|
| 2017/0046010 A1* | 2/2017 | Losh | G06F 3/04166 |
| 2017/0131798 A1* | 5/2017 | Geaghan | G06F 3/03545 |
| 2017/0364184 A1* | 12/2017 | Weinerth | G06F 3/0442 |
| 2019/0064999 A1* | 2/2019 | Kang | G06F 3/044 |
| 2019/0095006 A1* | 3/2019 | Shahparnia | G06F 3/0446 |
| 2020/0233531 A1* | 7/2020 | Weinerth | G06F 3/041662 |

* cited by examiner

US 11,029,780 B1

DYNAMIC RESCAN TO REDUCE LANDING ARTIFACTS

TECHNICAL FIELD

The present implementations relate generally to capacitive sensing, and specifically to dynamically repeating portions of a capacitive scan to reduce landing artifacts.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

An input device may scan the sensing region to acquire one or more frames of capacitive sensor data. Each frame of sensor data may represent an "image" or snapshot of the capacitive properties of the sensing region. Objects in, or proximate to, the sensing region may alter the capacitive properties of the sensing region. Accordingly, the input device may detect a position and/or movement of objects based on changes in one or more frames of sensor data. In some instances, an object may land on a portion of the sensing region that is currently being scanned, creating artifacts (referred to as "landing artifacts") in the resulting frame of sensor data. Similar artifacts may occur when an object is lifted from a portion of the sensing region that is currently being scanned. Landing artifacts may affect the accuracy with which the input device can detect and/or determine the position of objects in the sensing region. It is therefore desirable to reduce or eliminate the effects of landing artifacts when scanning the sensing region.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for dynamically rescanning an array of sensor electrodes is disclosed. One innovative aspect of the subject matter of this disclosure can be implemented in an input device including a processing system and an array of sensor electrodes configured for capacitive sensing in a sensing region of the input device. The processing system is configured to perform a first scan of the array over a plurality of iterations to acquire a frame of sensor data, where a different subframe of the sensor data is acquired from each iteration of the first scan. During each iteration of the first scan, the processing system compares the subframe of sensor data acquired from the iteration with a respective subframe of sensor data acquired prior to the iteration. Further, the processing system may selectively repeat one or more iterations of the first scan based on the comparison.

Another innovative aspect of the subject matter of this disclosure can be implemented in a method of capacitive sensing performed by an input device. The method includes steps of performing a first scan of an array of sensor electrodes over a plurality of iterations to acquire a frame of sensor data, where a different subframe of the sensor data is acquired from each iteration of the first scan; comparing, during each iteration of the first scan, the subframe of sensor data acquired from the iteration with a respective subframe of sensor data acquired prior to the iteration; and selectively repeating one or more iterations of the first scan based on the comparison.

Another innovative aspect of the subject matter of this disclosure can be implemented in a system including processing circuitry and a memory. The memory stores instructions that, when executed by the processing circuitry, causes the system to perform a first scan of an array of sensor electrodes over a plurality of iterations to acquire a frame of sensor data, where a different subframe of the sensor data is acquired from each iteration of the first scan; compare, during each iteration of the first scan, the subframe of sensor data acquired from the iteration with a respective subframe of sensor data acquired prior to the iteration; and selectively repeat one or more iterations of the first scan based on the comparison.

BRIEF DESCRIPTION OF THE DRAWINGS

The present implementations are illustrated by way of example and are not intended to be limited by the figures of the accompanying drawings.

DETAILED DESCRIPTION

Figure 1:
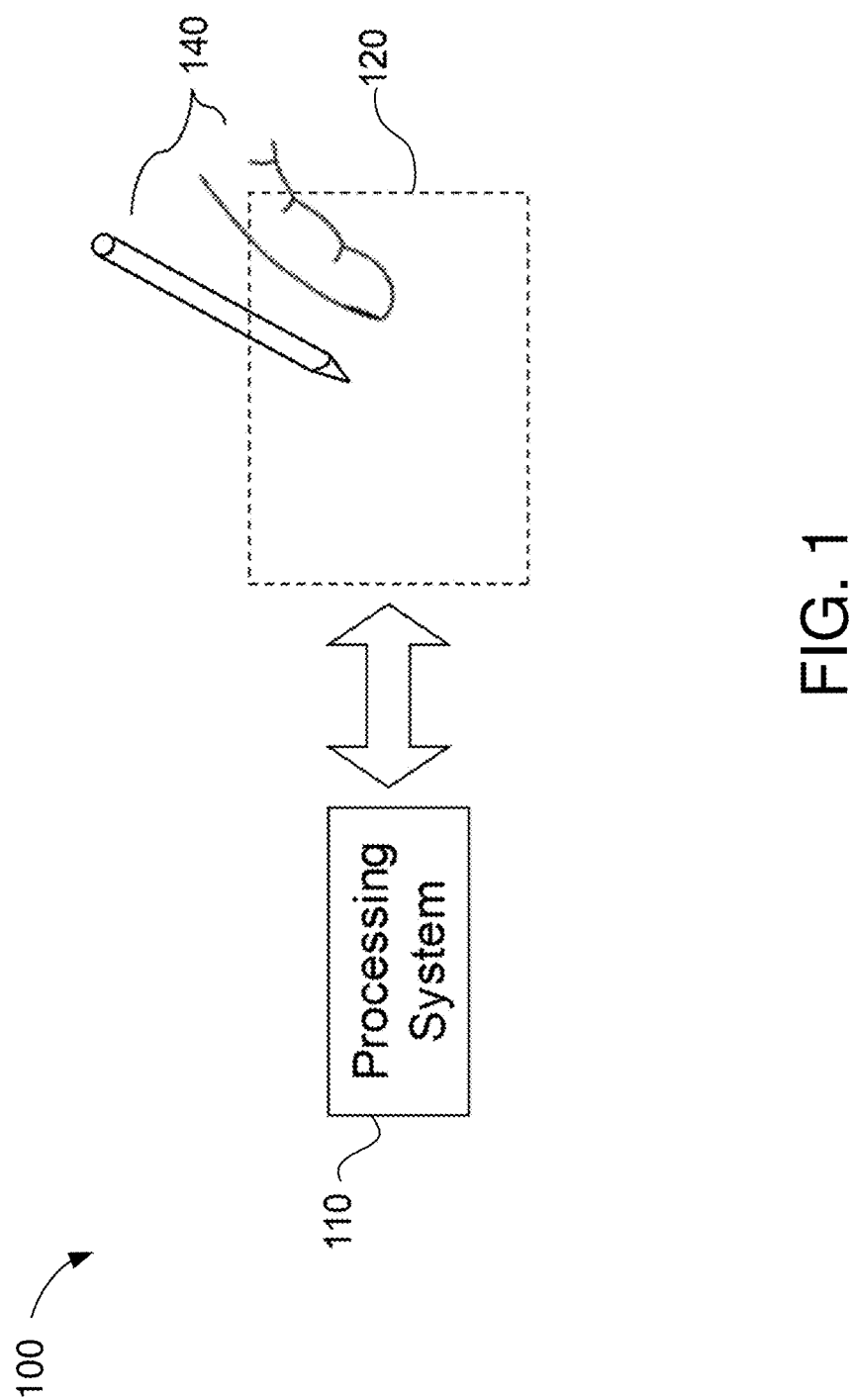
FIG. 1 shows an example input device which may be used with the present implementations.

Various implementations relate generally to input devices capable of capacitive sensing. Some implementations more specifically relate to dynamically rescanning an array of sensor electrodes to reduce or eliminate landing artifacts in a frame of capacitive sensor data. An input device may scan the array of sensor electrodes over a number of iterations to acquire a frame of sensor data. During each iteration, the input device may acquire a respective subframe of the sensor data. In some implementations, during each iteration of the scan, the input device may compare the subframe of sensor data acquired from the current iteration of the scan with a respective subframe of sensor data acquired prior to the current iteration and may selectively repeat one or more iterations of the scan based on the comparison. More specifically, the input device may repeat the one or more iterations of the scan in response to detecting a change or difference between the subframe of the current iteration and the previously-acquired subframe.

As used herein, the term "landing artifact" may refer to any artifact that occurs in a frame of sensor data as a result of dynamic changes in the sensing region as it is concurrently being scanned. In some instances, a landing artifact may be produced when an input object lands on a portion of the sensing region that is currently being scanned. Similar artifacts may be produced when an input object is lifted from a portion of the sensing region that is currently being scanned. Such artifacts may be referred to as "lifting artifacts." The term "landing object" is used herein to refer to any input object which produces a landing artifact or a lifting artifact (such as an object landing in, or lifting off, the sensing region as it is being scanned).

Particular implementations of the subject matter described in this disclosure can be implemented to realize one or more of the following potential advantages. By comparing each subframe of sensor data from the current scan with a respective subframe of previously acquired sensor data, aspects of the present disclosure may detect landing or lifting artifacts in one or more of the subframes. More specifically, by performing the comparison during each iteration of the scan, such landing or lifting artifacts may be detected prior to completing the current scan. As a result, one or more iterations of the scan may be repeated, to reacquire the one or more subframes that may have been affected by landing or lifting artifacts, before assembling the subframes into a frame of capacitive sensor data. Thus, aspects of the present disclosure may reduce or eliminate landing or lifting artifacts in capacitive frames without sacrificing the latency of object detection.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general-purpose processor, conventional processor, controller, microcontroller, special-purpose processor, and/or state machine capable of executing scripts or instructions of one or more software programs stored in memory.

FIG. 1 shows an example input device 100 within which the present implementations may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, digital cameras, and in-car entertainment systems).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, active pens, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some implementations, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some implementations, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some implementations, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some implementations, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some implementations, the processing system 110 may control one or more sensor electrodes to detect objects in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In some other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some implementations, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some implementations, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some implementations, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some implementations, the processing system 110 may further determine positional information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information.

In some implementations, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some implementations, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some implementations, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

Figure 2A:
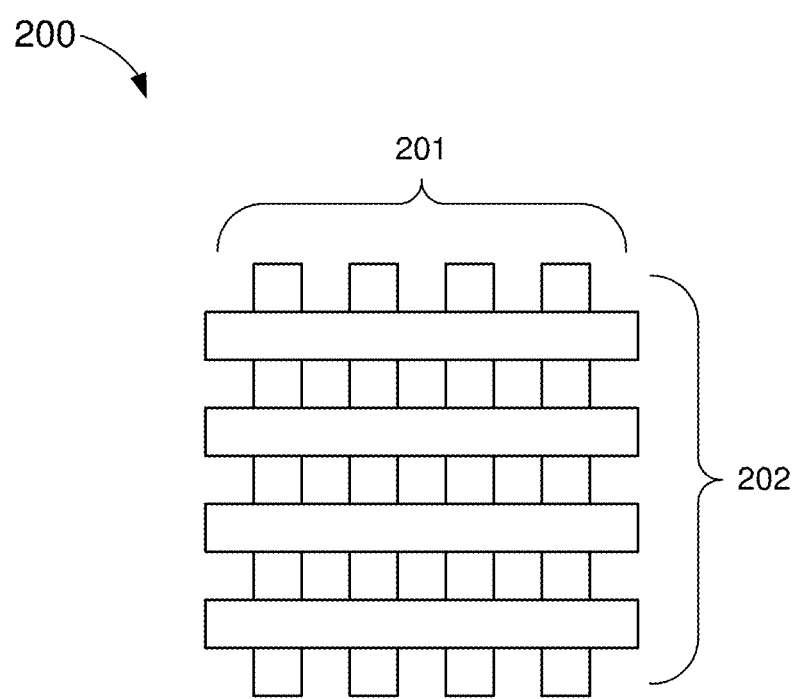
FIG. 2A shows an example array of sensor electrodes according to some implementations.

FIG. 2A shows an example array of sensor electrodes 200 according to some implementations. The array 200 is formed by a number of sensor electrodes 201 arranged in a vertical pattern and a number of sensor electrodes 202 arranged in a horizontal pattern. In some implementations, the array of sensor electrodes 200 may form at least a portion of the sensing region 120 of FIG. 1.

In some implementations, the sensor electrodes 201 and 202 may be arranged on different sides of the same substrate. For example, the sensor electrodes 201 and 202 may be disposed on one surface of the substrate. In some other implementations, the sensor electrodes 201 and 202 may be arranged on different substrates. For example, the sensor electrodes 201 and 202 may be disposed on surfaces of different substrates that are adhered together. Still further, in some implementations, the sensor electrodes 201 and 202 may be arranged on the same side or surface of a common substrate. For example, sensor electrodes 201 may include jumpers in region where the sensor electrodes 201 cross over sensor electrodes 202 (such that the jumpers are insulated from the sensor electrodes 202).

In the example of FIG. 2A, sensor electrodes 201 are shown to extend in a first (e.g., vertical) direction and sensor electrodes 202 are shown to extend in a second (e.g., horizontal) direction. Although the sensor electrodes 201 and 202 are depicted in a perpendicular grid arrangement, in some other implementations the sensor electrodes 201 and 202 may be arranged in other patterns. For example, in some implementations, the sensor electrodes 201 may be parallel or diagonal to the sensor electrodes 202. In the example of FIG. 2A, each of the sensor electrodes 201 and 202 is shown to have substantially the same shape and size. However, in some other implementations, the sensor electrodes 201 and 202 may be of various shapes and/or sizes.

A processing system (e.g., the processing system 110 of FIG. 1) may scan the array of sensor electrodes 201 and 202 to detect inputs in the sensing region. In some implementations, the sensor electrodes 201 and 202 may be configured to implement absolute capacitive sensing techniques. For example, the processing system may drive one or more of the sensor electrodes 201 and/or 202 with modulated signals (e.g., "sensing signals") to determine changes in the absolute capacitance of the sensor electrodes. In some other implementations, the sensor electrodes 201 and 202 may be configured to implement transcapacitive sensing techniques. For example, the processing system may drive sensing signals on transmitter electrodes (e.g., sensor electrodes 202) and receive resulting signals on receiver electrodes (e.g., sensor electrodes 201).

A "capacitive pixel" may represent an area of localized capacitive coupling between sensor electrodes 201 and sensor electrodes 202. The capacitive coupling between sensor electrodes 201 and sensor electrodes 202 may change with a proximity and/or motion of input objects in the sensing region provided by the array of sensor electrodes 200. A capacitive pixel may also represent an area of localized capacitance between an input object and sensor electrodes 201 or sensor electrodes 202. Thus, the absolute capacitance of the sensor electrodes 201 and/or 202 may change with a proximity and/or motion of an input object in the sensing region.

Figure 2B:
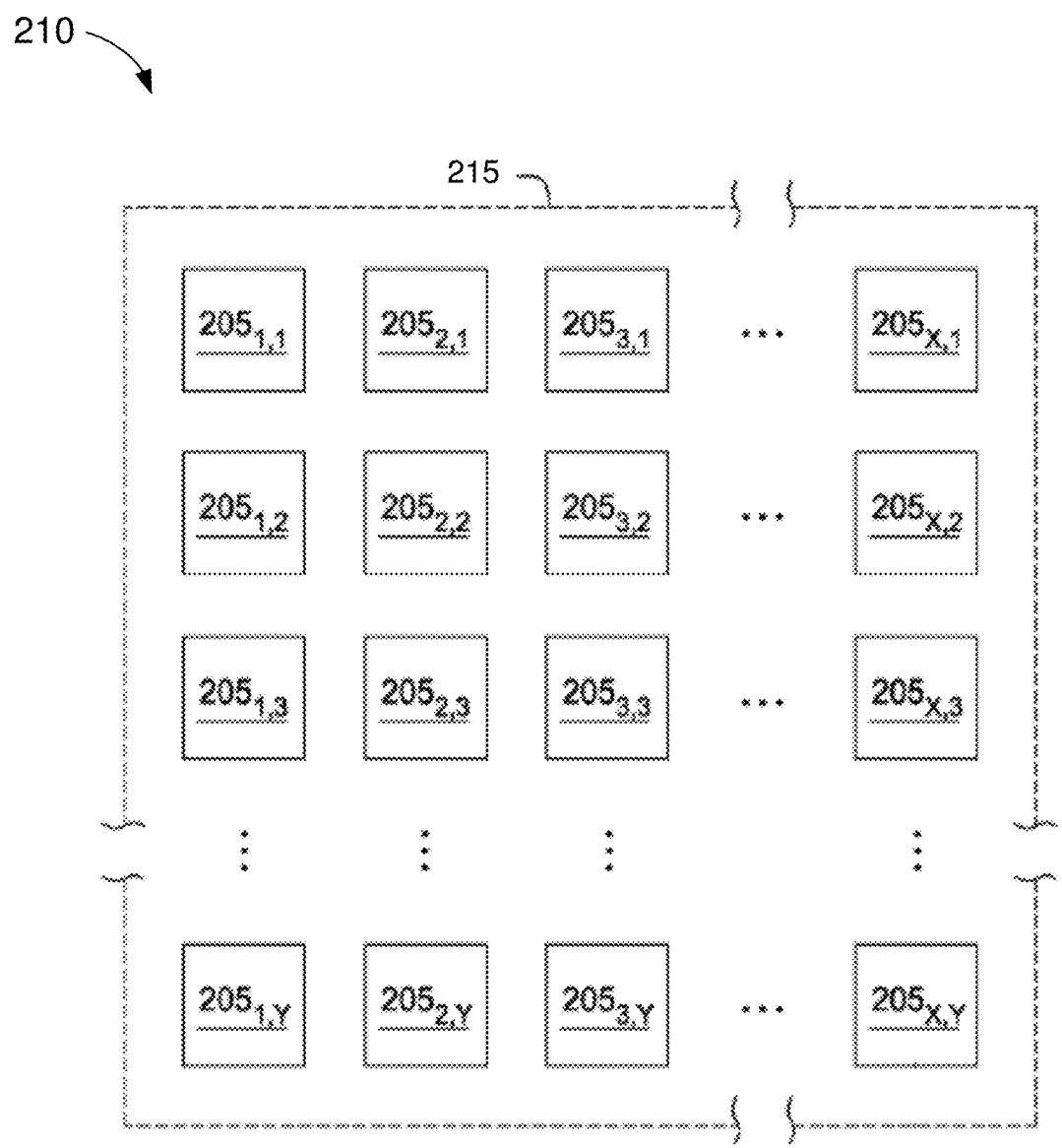
FIG. 2B shows another example array of sensor electrodes according to some implementations.

FIG. 2B shows another example array of sensor electrodes 210 according to some implementations. The array 210 is formed by a number of sensor electrodes $205_{X,Y}$ (referred to collectively as sensor electrodes 205) arranged in an advanced matrix pad (AMP) configuration. The sensor electrodes 205 may provide a sensing region 215 that encompasses any space above, around, in, and/or proximate to the array 210. The size, shape, and/or location of the sensing region 215 may vary depending on actual implementations.

The sensor electrodes 205 are arranged in a number (X) of columns and a number (Y) of rows. In some implementations, the sensor electrodes 205 may be configured to implement absolute capacitance sensing techniques. For example, a processing system (not shown for simplicity) may drive each sensor electrode 205 with a modulated signal and measure a capacitance between the electrode 205 and the input object based on the modulated signal. In the example of FIG. 2B, capacitive pixels may be formed between an individual sensor electrode 205 and an electrical ground. The capacitive coupling may change with a proximity and/or motion of input objects in the sensing region 215 and may thus be used to determine the presence and/or position of an input object in the sensing region 215.

With reference to FIGS. 2A and 2B, a processing system may scan the array of sensor electrodes 200 or 210 over a number (N) of iterations to acquire a frame of capacitive sensor data (e.g., a "capacitive frame"). During each iteration of the scan, the processing system may drive the array of sensor electrodes 200 or 210 with a different pattern of sensing signals to acquire a respective subframe of sensor data. Upon completion of the scan, the processing system may combine the N subframes acquired from the N iterations, respectively, to produce a single capacitive frame. Each capacitive frame may represent an "image" or snapshot of the capacitive pixels in the array 200 or 210 at a given instance of time. Thus, the processing system may detect objects in or proximate to the sensing region based on changes in capacitance indicated in a capacitive frame (e.g., relative to a baseline).

In some implementations, the processing system may scan the array of sensor electrodes 200 or 210 in a raster order (e.g., top-to-bottom or left-to-right). In other words, only one subset of rows (or columns) may be driven with a sensing signal per iteration of the scan. The processing system may drive a sensing signal onto a different subset of rows (or columns) of sensor electrodes during each successive iteration of the scan. For example, in a top-to-bottom raster scan, individual rows (or subsets of rows) of sensor electrodes may be driven in succession from the top of the array 200 or 210 to the bottom of the array 200. As a result, each row of sensor electrodes in the array 200 or 210 is scanned only once after N iterations. Thus, each subframe of sensor data may represent a capacitive profile associated with a particular row or portion of the sensing region. The N subframes may be combined or aggregated to form a frame of sensor data representative of the sensing region in its entirety.

In some other implementations, the processing system may scan the array of sensor electrodes 200 or 210 using code division multiplexing (CDM) techniques. In a CDM sensing scheme, multiple sensing signals (of varying polarities) may be driven onto multiple rows (or columns) of sensor electrodes, concurrently, per iteration of the scan. For example, during each iteration of the scan, some rows of sensor electrodes may be driven with a positive polarity (+1) sensing signal, some rows of sensor electrodes may be driven with a negative polarity (−1) sensing signal, and some rows of sensor electrodes may not be driven (0) with a sensing signal. Thus, each subframe of sensor data may represent a capacitive profile associated with a different CDM "block." The N subframes may be decoded in accordance with a CDM matrix to recover a frame of sensor data representative of the sensing region.

As described above, landing artifacts may occur in a capacitive frame when an input object (such as a finger) makes contact with, or enters a threshold proximity of, the sensing region while a scan is in process. Lifting artifacts may occur when an input objects lifts off, or leaves a threshold proximity of, the sensing region while a scan is in process. More specifically, depending on the time at which an object lands in or lifts off the sensing region, the landing object may interfere with one or more iterations of the scan. For example, an object that lands in the sensing region during the $i^{th}$ iteration of a capacitive scan may cause a spike in the $i^{th}$ subframe of sensor data but may not be reflected in the previously-acquired subframe associated with the same capacitive scan. The discontinuity between adjacent or successive subframes may be perceived as interference or artifacts when the subframes are combined or aggregated into a single capacitive frame.

Figure 3A:
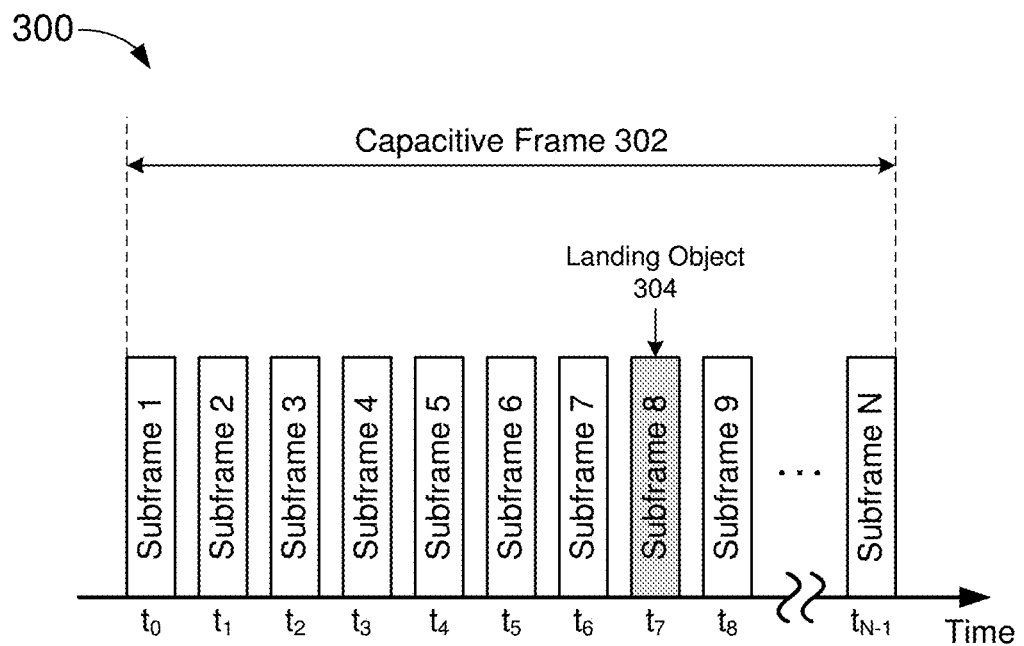
FIG. 3A shows a timing diagram depicting an example capacitive scanning operation for acquiring a frame of capacitive sensor data.

FIG. 3A shows a timing diagram 300 depicting an example capacitive scanning operation for acquiring a frame of capacitive sensor data. The capacitive scanning operation may be performed by an input device such as, for example, the input device 100 of FIG. 1. In the example of FIG. 3A, the input device may scan an array of sensor electrodes (such as the arrays 200 or 210 of FIGS. 2A and 2B, respectively) over a number (N) of iterations to acquire a capacitive frame 302. During each iteration of the scan, the input device may capture a respective subframe of sensor data. For example, the input device may acquire subframes 1-N by driving the array of sensor electrodes with different patterns of sensing signals at times $t_0$-$t_{N-1}$, respectively. The N subframes may be combined or aggregated to produce the capacitive frame 302.

In some implementations, each pattern of sensing signals may represent a respective row of sensor electrodes in the array (e.g., when implementing a raster scan). For example, subframe 1 may reflect a state of the capacitive pixels associated with the top row (or group of adjacent rows) of sensor electrodes and subframe N may reflect a state of the capacitive pixels associated with the bottom row (or group of adjacent rows) of sensor electrodes. In some other implementations, each pattern of sensing signals may represent a respective CDM block (e.g., when implementing CDM sensing techniques). For example, subframe 1 may reflect a state of the capacitive pixels associated with the rows of sensor electrodes driven in accordance with the $1^{st}$ CDM block (of a series of N CDM blocks) and subframe N may reflect a state of the capacitive pixels associated with the rows of sensor electrodes driven in accordance with the $N^{th}$ CDM block.

In the example of FIG. 3A, an input object 304 lands in the sensing region at time $t_7$, coinciding with the $8^{th}$ iteration of the scan. Thus, the landing object 304 may cause a spike in the capacitive sensor information captured by the $8^{th}$ subframe (shaded in gray). However, the presence of the landing object 304 may not be reflected in subframes 1-7. Further, subframes 9-N may attribute different magnitudes or polarities to the capacitance associated with the landing object 304 (e.g., compared to the $8^{th}$ subframe). As a result, when the N subframes are combined or aggregated, the discontinuity in capacitive sensor information in successive subframes (centered around the $8^{th}$ subframe) may produce landing or lifting artifacts in the capacitive frame 320.

Figure 3B:
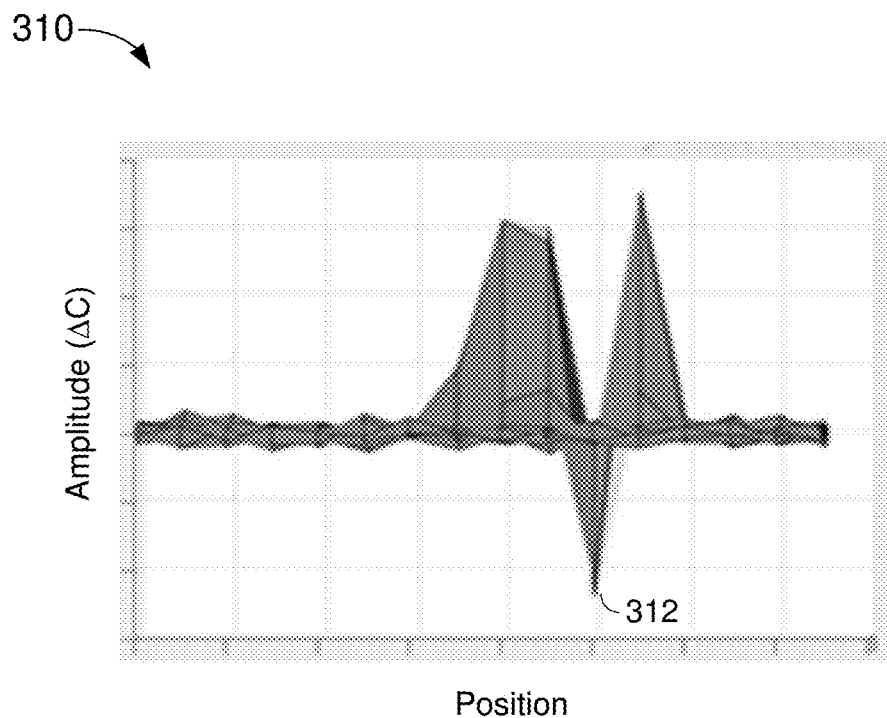
FIG. 3B shows an example capacitive image resulting from the scanning operation of FIG. 3A.

FIG. 3B shows an example capacitive image 310 resulting from the scanning operation of FIG. 3A. The capacitive image 310 may be one example of the capacitive frame 302 of FIG. 3A. For simplicity, only a two-dimensional slice of the capacitive frame 302 is illustrated by the capacitive image 310. As shown in FIG. 3B, the capacitive image 310 includes a landing (or lifting) artifact 312 at a position in which the landing object 304 makes contact with, or enters a threshold proximity of, the array of sensor electrodes (or a sensing region associated therewith). In the example of FIG. 3B, the change in capacitance (AC) attributed to the landing (or lifting) artifact 312 has a different polarity than the changes in capacitance associated with surrounding areas of the sensing region. In actual implementations, the amplitudes or polarities of landing or lifting artifacts may vary from those depicted in FIG. 3B.

The presence of landing or lifting artifacts (such as the landing artifact 312 of FIG. 3B) may cause errors in the detection of input objects or determination of position information. In some implementations, an input device may discard capacitive frames containing landing or lifting artifacts. For example, upon detecting landing or lifting artifacts in a given capacitive frame, the input device may ignore that frame for purposes of object detection. Instead, the input device may rescan the array of sensor electrodes and/or may perform object detection in another capacitive frame acquired subsequent to the discarded frame. However, aspects of the present disclosure recognize that discarding capacitive frames increases the latency of object detection, which may not be suitable for some capacitive sensing applications.

In some implementations, an input object may dynamically repeat a portion of a scanning operation to reduce or eliminate landing or lifting artifacts in a capacitive frame. For example, during each iteration of a scan, the input device may compare the subframe acquired from the current iteration with a respective subframe acquired prior to the current iteration. Aspects of the present disclosure recognize that an object landing in (or lifting from) the sensing region may trigger a spike in the capacitance reflected in the current subframe compared to the capacitance reflected in the prior subframe. Thus, if a substantial change or difference is detected between the current subframe and the prior subframe, the input device may repeat one or more iterations of the current scan to acquire updated sensing information for the respective subframes.

In some implementations, the input device may repeat the current iteration of the scan (e.g., in which the change in capacitance is detected). In some other implementations, the input device may repeat one or more iterations preceding the current iteration of the scan (e.g., including the current iteration). The input device may then combine the updated subframes with any non-updated subframes to produce the capacitive frame of sensor data. In other words, rather than discarding the entire frame, the input device may discard only one or more subframes that are likely to be affected by the presence of a landing object. As a result, the maximum latency of object detection may be limited to a single capacitive frame.

Figure 4:
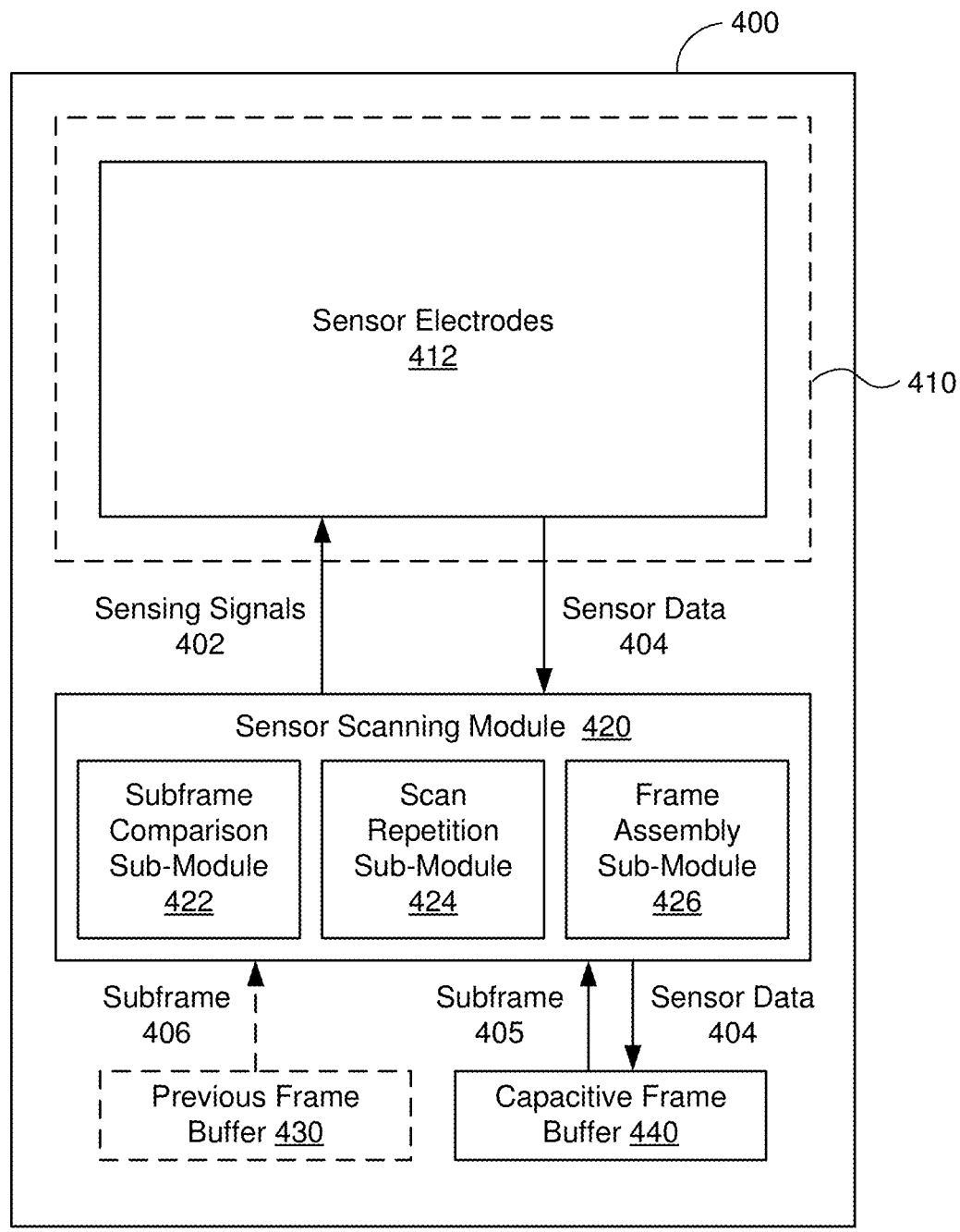
FIG. 4 shows a block diagram of an input device, in accordance with some implementations.

FIG. 4 shows a block diagram of an input device 400, in accordance with some implementations. The input device 400 includes a sensing region 410 and a sensor scanning module 420. The sensing region 410 may encompass any space above, around, in, and/or proximate to the input device 400 in which the input device 400 is able to detect user input, such as provided by one or more input objects (not shown for simplicity). The size, shape, and/or location of the sensing region 410 may vary depending on actual implementations.

In some implementations, the sensing region 410 includes, or is otherwise coupled to, an array of sensor electrodes 412. The sensor electrodes 412 may detect inputs in the sensing region 410 using capacitive sensing technologies (such as described above with respect to FIGS. 1, 2A, and 2B). For example, the sensor electrodes 412 may create an electric field in and/or around the sensing region 410. The input device 400 may detect inputs based on changes in a capacitance of the sensor electrodes 412 and/or the electric field.

The sensor electrodes 412 are coupled to the sensor scanning module 420. The sensor scanning module 420 may be implemented by, or include at least a portion of, a processing system (such as processing system 110 of FIG. 1) that controls an operation of the sensor electrodes 412. The sensor scanning module 420 may scan the sensor electrodes 412 over a number (N) of iterations to acquire one or more frames of capacitive sensor information. More specifically, the sensor scanning module 420 may iteratively transmit sensing signals 402 to, and receiving sensor data 404 from, the sensor electrodes 412. During each iteration of the scan, the sensor scanning module 420 may drive the sensor electrodes 412 with a different pattern of sensing signals 402 to acquire a respective subframe of sensor data 404 (such as described with reference to FIGS. 2A-3A). In some implementations, the sensor scanning module 420 may include a subframe comparison sub-module 422, a scan repetition sub-module 424, and a frame assembly sub-module 426.

The subframe comparison sub-module 422 may compare the subframe of sensor data 404 acquired from each iteration of the current scan with a respective subframe of sensor data acquired prior to that iteration. In some implementations, the prior subframe of sensor data may be another subframe acquired during the current scan (such as from the iteration immediately preceding the current iteration). For example, the input device 400 may include a capacitive frame buffer 440 configured to store or aggregate the subframes of sensor data 404 to produce a single capacitive frame. During each iteration of the current scan, the subframe comparison sub-module 422 may compare the current subframe of sensor data 404 with a respective subframe 405 stored in the capacitive frame buffer 440. In some implementations, the subframe comparison sub-module 422 may detect a presence of a landing object when a threshold difference is detected between the current subframe of sensor data 404 and the respective subframe 405 stored in the capacitive frame buffer 440.

In some other implementations, the prior subframe of sensor data may be a subframe acquired during a previous scan of the sensor electrodes 412. For example, in some aspects, the input device 400 may further include a previous frame buffer 430 configured to store a frame of capacitive sensor data acquired as a result of the previous scan. During each iteration of the current scan, the subframe comparison sub-module 422 may compare the current subframe of sensor data 404 with a respective subframe 406 stored in the previous frame buffer 430. For example, the subframe comparison sub-module 422 may compare the subframe of sensor data 404 acquired from the $i^{th}$ iteration of the current scan with the subframe 406 acquired from the $i^{th}$ iteration of the previous scan. In some implementations, the subframe comparison sub-module 422 may detect a presence of a landing object when a threshold difference is detected between the current subframe of sensor data 404 and the respective subframe 406.

The scan repetition sub-module 424 may repeat one or more iterations of the current scan when a landing object is detected by the subframe comparison sub-module 422. For example, the scan repetition sub-module 424 may repeat one or more patterns of sensing signals 402 to acquire updated sensor data 404 for one or more subframes likely to be affected by, or contribute to, landing or lifting artifacts. In some aspects, the repeated iterations may include the iteration in which the landing object is detected. In some other aspects, the repeated iterations may include one or more iterations preceding (and including) the iteration in which the landing object is detected. In some implementations, the scan repetition sub-module 424 may pause the current scan to repeat the one or more iterations. For example, the scan repetition sub-module 424 may repeat the one or more iterations before completing any remaining iterations of the scan. In some other implementations, the scan repetition sub-module 424 may restart the scan beginning from the next iteration. For example, the scan repetition sub-module 424 may complete the N-i remaining iterations of the scan before repeating the first i iterations.

The frame assembly sub-module 426 may assemble the subframes of sensor data 404 (including any updated subframes) into a single capacitive frame. More specifically, the frame assembly sub-module 426 may order (or reorder) the N subframes of sensor data 404 according to the order of the iterations of the scan. For example, the frame assembly sub-module 426 may store each of the N subframes of sensor data 404 in a respective location of the capacitive frame buffer 440. Thus, when one or more iterations of the scan are repeated, the frame assembly sub-module 426 may replace one or more existing subframes stored in the capacitive frame buffer 440 with respective updated subframes. In some implementations, the capacitive frame stored in the capacitive frame buffer 440 may be loaded into the previous frame buffer 430 when the sensor scanning module 420 initiates a subsequent scan of the sensor electrodes 412.

Figure 5A:
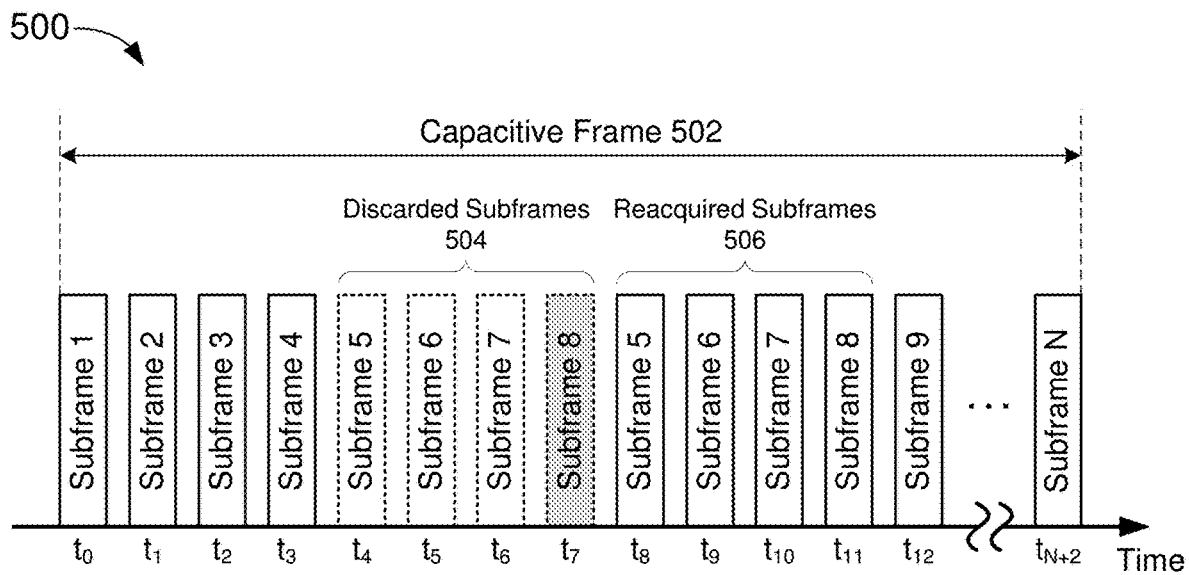
FIG. 5A shows a timing diagram depicting an example capacitive scanning operation, in accordance with some implementations.

FIG. 5A shows a timing diagram 500 depicting an example capacitive scanning operation, in accordance with some implementations. The capacitive scanning operation may be performed by an input device such as, for example, any of the input devices 100 or 400 of FIGS. 1 and 4, respectively. In the example of FIG. 5A, the input device may scan an array of sensor electrodes (such as any of the arrays of sensor electrodes 200, 210 or 412 of FIGS. 2A, 2B, and 4, respectively) over a number (N) of iterations to acquire a capacitive frame 502. During each iteration of the scan, the input device may capture a respective subframe of sensor data. For example, the input device may acquire subframes 1-N by driving the array of sensor electrodes with respective patterns of sensing. The N subframes may then be combined or aggregated to produce the capacitive frame 502.

In some implementations, each pattern of sensing signals may represent a respective row of sensor electrodes in the array (e.g., when implementing a raster scan). For example, subframe 1 may reflect a state of the capacitive pixels associated with the top row (or group of adjacent rows) of sensor electrodes and subframe N may reflect a state of the capacitive pixels associated with the bottom row (or group of adjacent rows) of sensor electrodes. In some other implementations, each pattern of sensing signals may represent a respective CDM block (e.g., when implementing CDM sensing techniques). For example, subframe 1 may reflect a state of the capacitive pixels associated with the rows of sensor electrodes driven in accordance with the $1^{st}$ CDM block (of a series of N CDM blocks) and subframe N may reflect a state of the capacitive pixels associated with the rows of sensor electrodes driven in accordance with the $N^{th}$ CDM block.

In some implementations, the input device may compare the subframe acquired from each iteration of the current scan with a respective subframe acquired from a previous scan to detect a presence of a landing object (such as described with reference to FIG. 4). For example, at time $t_0$, the input device may compare subframe 1 with a respective subframe acquired from the $1^{st}$ iteration of the previous scan; at time $t_1$, the input device may compare subframe 2 with a respective subframe acquired from the $2^{nd}$ iteration of the previous scan; and at time $t_3$, the input device may compare subframe 3 with a respective subframe acquired from the $3^{rd}$ iteration of the previous scan. The input device may continue this comparison for each iteration of the scan until a landing object is detected or all N iterations are completed.

In the example of FIG. 5A, the input device may detect the presence of a landing object, at time $t_7$, based on the comparison of subframe 8 with a respective subframe acquired from the $8^{th}$ iteration of the previous scan. In some implementations, upon detecting the presence of a landing object, the input device may discard the subframe acquired from the current iteration of the scan in addition to subframes acquired from the 3 previous iterations of the scan. The input device may then repeat the 4 iterations to acquire updated sensor information for the discarded subframes. With reference for example to FIG. 5A, the input device may discard subframes 5-8 (referred to as discarded subframes 504) and may repeat the $5^{th}$-$8^{th}$ iterations of the scan at times $t_8$-$t_{11}$, respectively, to acquire updated subframes 5-8 (referred to as reacquired subframes 506). The input device may then complete the remainder of the scanning operation by acquiring subframes 9-N at times $t_{12}$-$t_{N+2}$, respectively. Upon completion of the scanning operation (after time $t_{N+2}$), the input device may substitute the reacquired subframes 506 for the discarded subframes 504 when combining the N subframes to produce the capacitive frame 502.

Figure 5B:
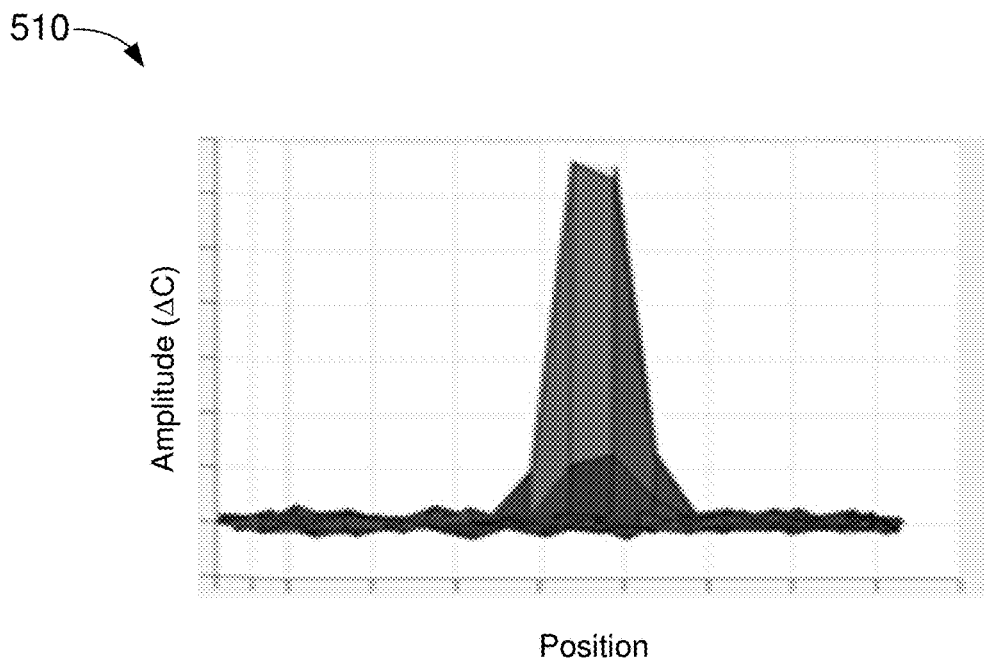
FIG. 5B shows an example capacitive image resulting from the scanning operation of FIG. 5A.

FIG. 5B shows an example capacitive image resulting from the scanning operation of FIG. 5A. The capacitive image 510 may be one example of the capacitive frame 502 of FIG. 5A. For simplicity, only a two-dimensional slice of the capacitive frame 502 is illustrated by the capacitive image 510. In contrast with the capacitive image 310 depicted FIG. 3B, the capacitive image 510 does not include any landing or lifting artifacts (such as the landing artifact 312). In the example of FIG. 5B, the change in capacitance (AC) consistently tracks the position of the input object. More specifically, the capacitive image 510 shows a consistently high change in capacitance in the area at which the input object makes contact with, or enters a threshold proximity of, the sensing region. Accordingly, the capacitive image 510 may be reliably used for object detection and/or position determination.

Figure 6:
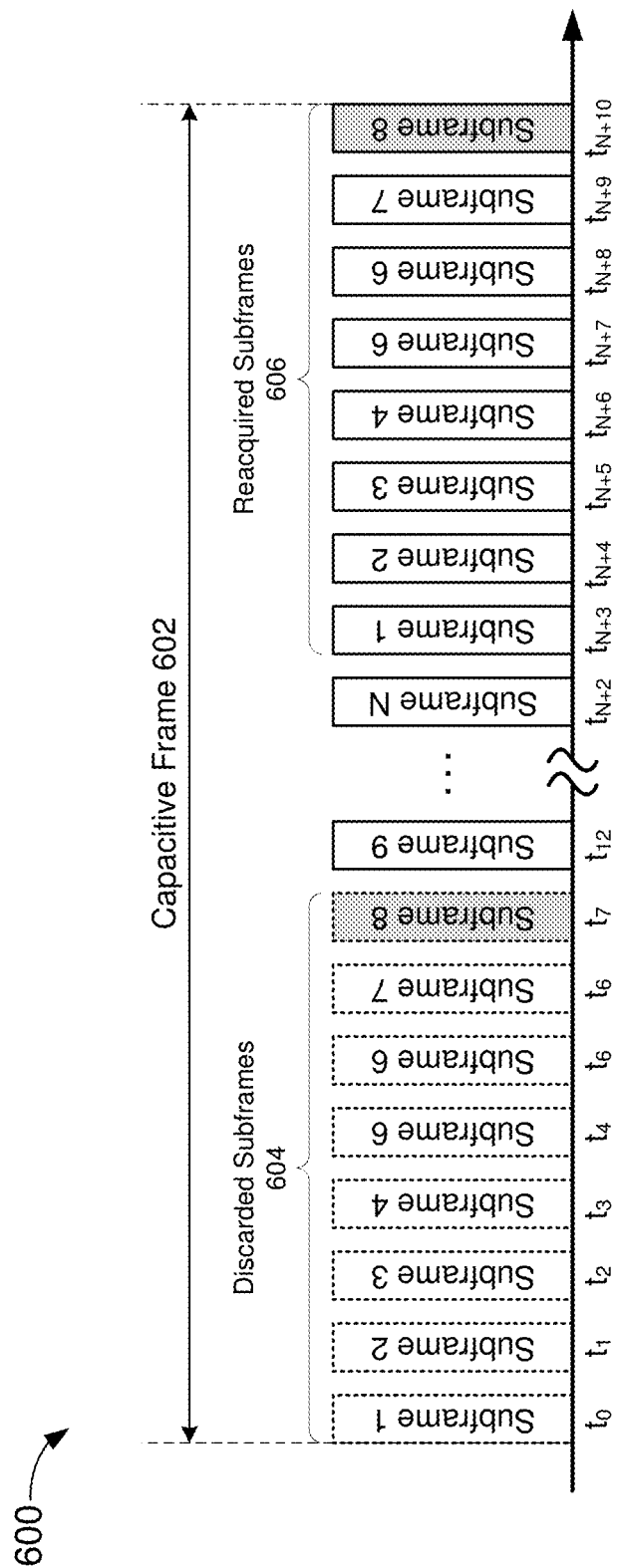
FIG. 6 shows a timing diagram depicting another example scanning operation, in accordance with some implementations.

FIG. 6 shows a timing diagram 600 depicting another example scanning operation, in accordance with some implementations. The capacitive scanning operation may be performed by an input device such as, for example, any of the input devices 100 or 400 of FIGS. 1 and 4, respectively. In the example of FIG. 6, the input device may scan an array of sensor electrodes (such as any of the arrays of sensor electrodes 200, 210, or 412 of FIGS. 2A, 2B, and 4, respectively) over a number (N) of iterations to acquire a capacitive frame 602. During each iteration of the scan, the input device may capture a respective subframe of sensor data. For example, the input device may acquire subframes 1-N by driving the array of sensor electrodes with respective patterns of sensing. The N subframes may then be combined or aggregated to produce the capacitive frame 602.

In some implementations, each pattern of sensing signals may represent a respective row of sensor electrodes in the array (e.g., when implementing a raster scan). For example, subframe 1 may reflect a state of the capacitive pixels associated with the top row (or group of adjacent rows) of sensor electrodes and subframe N may reflect a state of the capacitive pixels associated with the bottom row (or group of adjacent rows) of sensor electrodes. In some other implementations, each pattern of sensing signals may represent a respective CDM block (e.g., when implementing CDM sensing techniques). For example, subframe 1 may reflect a state of the capacitive pixels associated with the rows of sensor electrodes driven in accordance with the $1^{st}$ CDM block (of a series of N CDM blocks) and subframe N may reflect a state of the capacitive pixels associated with the rows of sensor electrodes driven in accordance with the $N^{th}$ CDM block.

In some implementations, the input device may compare the subframe acquired from each iteration of the current scan with a respective subframe acquired from a previous scan to detect a presence of a landing object (such as described with reference to FIG. 4). For example, at time $t_0$, the input device may compare subframe 1 with a respective subframe acquired from the $1^{st}$ iteration of the previous scan; at time $t_1$, the input device may compare subframe 2 with a respective subframe acquired from the $2^{nd}$ iteration of the previous scan; and at time $t_3$, the input device may compare subframe 3 with a respective subframe acquired from the $3^{rd}$ iteration of the previous scan. The input device may continue this comparison for each iteration of the scan until a landing object is detected or all N iterations are completed.

In the example of FIG. 6, the input device may detect the presence of a landing object, at time $t_7$, based on the comparison of subframe 8 with a respective subframe acquired from the $8^{th}$ iteration of the previous scan. In some implementations, upon detecting the presence of a landing object, the input device may discard the subframes acquired from each iteration of the scan up to and including the current iteration. The input device may then restart the scan (e.g., by performing all N iterations) beginning with the next iteration. With reference for example to FIG. 6, the input device may discard subframes 1-8 (referred to as discarded subframes 604) and may proceed to acquire the remaining subframes 9-N at times $t_{12}$-$t_{N+2}$, respectively. The input device may then repeat the $1^{st}$-$8^{th}$ iterations of the scan at times $t_{N+3}$-$t_{N+10}$, respectively, to acquire updated subframes 1-8 (referred to as reacquired subframes 606). Upon completion of the scanning operation (after time $t_{N+10}$), the input device may substitute the reacquired subframes 606 for the discarded subframes 604 when combining the N subframes to produce the capacitive frame 602.

Figure 7:
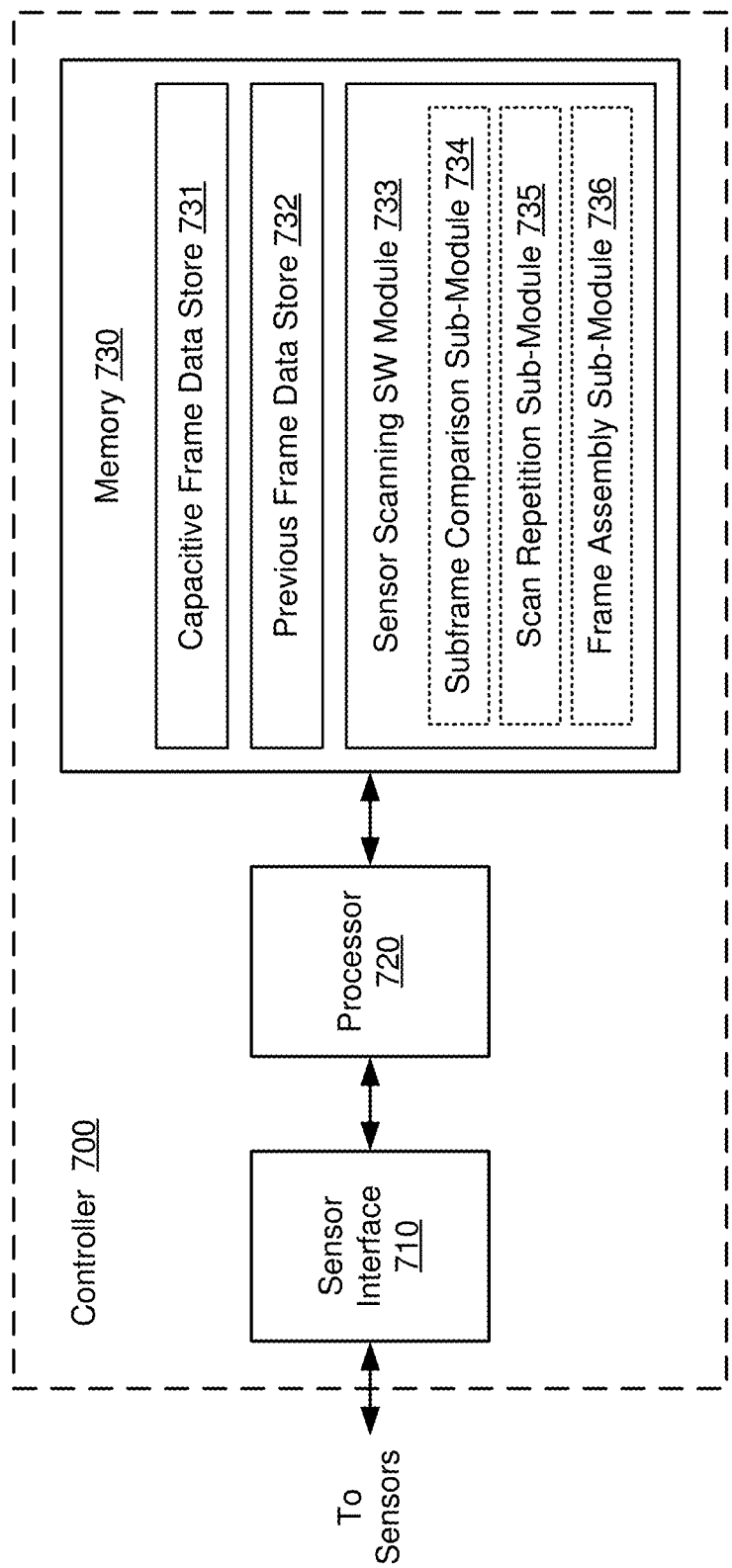
FIG. 7 shows a block diagram of a processing system, in accordance with some other implementations.

FIG. 7 shows a block diagram of an example controller 700 for an input device, in accordance with some other implementations. In some implementations, the controller 700 may be one example of the processing system 110 of FIG. 1. In some implementations, the controller 700 may include a sensor interface 710, a processor 720, and a memory 730.

The sensor interface 710 may be used to communicate with one or more capacitive sensors of an input device (such as the arrays of sensor electrodes 200, 210, or 412 of FIGS. 2A, 2B, and 4, respectively). For example, the sensor interface 710 may transmit signals to, and receive signals from, one or more sensors electrodes to detect inputs in a sensing region of the input device. In some implementations, the sensor interface 710 may be configured to drive individual rows (or subsets of rows) of sensor electrodes in a raster scan order. In some other implementations, the sensor interface 710 may be configured to drive multiple rows of sensor electrodes, concurrently, using CDM sensing techniques.

In some implementations, the memory 730 may include a capacitive frame data store 731 and a previous frame data store 732. The capacitive frame data store 731 may be configured to store a frame of capacitive sensor data from a current scan of the array of sensor electrodes. The previous frame data store 732 may be configured to store a frame of capacitive sensor data from a previous scan of the array of sensor electrodes. The memory 730 also may include a non-transitory computer-readable medium (e.g., one or more nonvolatile memory elements, such as EPROM, EEPROM, Flash memory, a hard drive, etc.) that may store at least the following software (SW) modules:

a sensor scanning SW module 733 to scan the array of sensor electrodes over a number of iterations to acquire a frame of sensor data, the sensor scanning SW module 733 including:
- a subframe comparison sub-module 734 to compare, during each iteration of the scan, the subframe of sensor data acquired from the current iteration with a respective subframe of sensor data acquired prior to the current iteration;
- a scan repetition sub-module 735 to selectively repeat one or more iterations of the scan based on the comparison; and
- a frame assembly sub-module 736 to assemble the subframes acquired from the repeated iterations of the scan into the frame of sensor data.

Each software module includes instructions that, when executed by the processor 720, cause the controller 700 to perform the corresponding functions. The non-transitory computer-readable medium of memory 730 thus includes instructions for performing all or a portion of the operations described below with respect to FIG. 8.

Processor 720 may be any suitable one or more processors capable of executing scripts or instructions of one or more software programs stored in memory 730. For example, the processor 720 may execute the sensor scanning SW module 733 to scan the array of sensor electrodes over a number of iterations to acquire a frame of sensor data. In executing the sensor scanning SW module 733, the processor 720 may further execute the subframe comparison sub-module 734, the scan repetition sub-module 735, and the frame assembly sub-module 736.

For example, the processor 720 may execute the subframe comparison sub-module 734 to compare, during each iteration of the scan, the subframe of sensor data acquired from the current iteration with a respective subframe of sensor data acquired prior to the current iteration. The processor 720 also may execute the scan repetition sub-module 735 to selectively repeat one or more iterations of the scan based on the comparison. Still further, the processor 720 may execute the frame assembly sub-module 736 to assemble the subframes acquired from the repeated iterations of the scan into the frame of sensor data.

Figure 8:
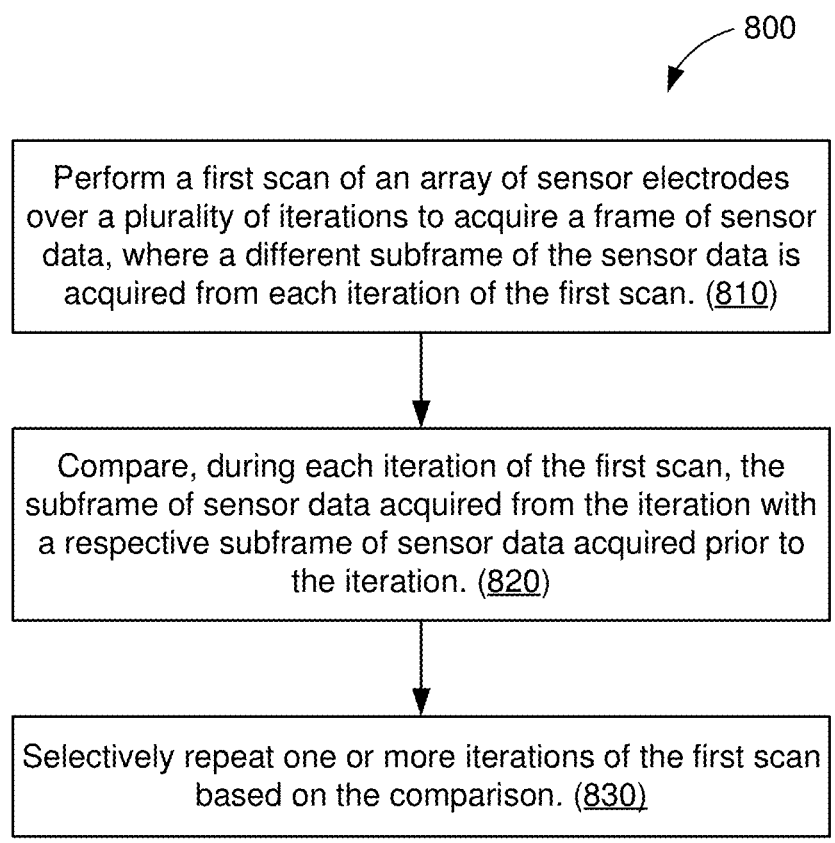
FIG. 8 shows an illustrative flowchart depicting an example capacitive scanning operation, in accordance with some implementations.

FIG. 8 shows an illustrative flowchart depicting an example capacitive scanning operation 800, in accordance with some implementations. With reference for example to FIG. 4, the operation 800 may be performed by the input device 400 to dynamically rescan an array of sensor electrodes to reduce or eliminate landing or lifting artifacts in captured frames of capacitive sensor information.

The input device performs a first scan of an array of sensor electrodes over a plurality of iterations to acquire a frame of sensor data, where a different subframe of the sensor data is acquired from each iteration of the first scan (810). For example, the input device may iteratively transmit sensing signals to, and receiving sensor data from, the sensor electrodes. During each iteration of the scan, the input device may drive the sensor electrodes with a different pattern of sensing signals to acquire a respective subframe of sensor data. In some implementations, each pattern of sensing signals may represent a respective row of sensor electrodes in the array (e.g., when implementing a raster scan). In some other implementations, each pattern of sensing signals may represent a respective CDM block (e.g., when implementing CDM sensing techniques).

The input device compares, during each iteration of the first scan, the subframe of sensor data acquired from the iteration with a respective subframe of sensor data acquired prior to the iteration (820). In some implementations, the prior subframe may be another subframe acquired during the first scan. For example, the input device may compare the subframe acquired from the $i^{th}$ iteration of the current scan with the subframe acquired from the $(i-1)^{th}$ iteration of the current scan. In some other implementations, the prior subframe may be a subframe acquired during a previous scan of the array. For example, the input device may compare the subframe acquired from the $i^{th}$ iteration of the current scan with the subframe acquired from the $i^{th}$ iteration of the previous scan (such as described with reference to FIGS. 5A and 6). The input device may perform this comparison as each subframe is acquired, prior to completing the first scan. In some implementations, the input device may detect a presence of a landing object when a threshold difference is detected between the current subframe of sensor data and the respective subframe.

Further, the input device may selectively repeat one or more iterations of the first scan based on the comparison (830). For example, the input device may repeat one or more patterns of sensing signals to acquire updated sensor data for one or more subframes likely to be affected by, or contribute to, landing or lifting artifacts. In some aspects, the repeated iterations may include the iteration in which the landing object is detected. In some other aspects, the repeated iterations may include one or more iterations preceding (and including) the iteration in which the landing object is detected. In some implementations, the input device may pause the current scan to repeat the one or more iterations (such as described with reference to FIG. 5A). In some other implementations, the input device may restart the scan beginning from the next iteration (such as described with reference to FIG. 6).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, implementations have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A controller for an input device, comprising: processing circuitry; and a memory storing instructions that, when executed by the processing circuitry, causes the controller to: perform a first scan of an array of sensor electrodes over a plurality of iterations to acquire a frame of sensor data, wherein a different subframe of the sensor data is acquired from each iteration of the first scan; compare, during each iteration of the first scan, the subframe of sensor data acquired from the iteration of the first scan with a respective subframe of sensor data acquired prior to the iteration of the first scan; and selectively repeat one or more iterations of the first scan based on the comparison.

2. The controller of claim 1, wherein execution of the instructions for selectively repeating the one or more iterations of the first scan causes the controller to:
   detect, as a result of the comparison, a difference between a first subframe of sensor data acquired during the first scan and a second subframe of sensor data acquired prior to the acquisition of the first subframe; and
   repeat the one or more iterations of the first scan responsive to detecting the difference between the first subframe and the second subframe.

3. The controller of claim 2, wherein the one or more iterations of the first scan include the iteration of the first scan in which the first subframe is acquired.

4. The controller of claim 3, wherein the one or more iterations of the first scan further include one or more iterations of the first scan immediately preceding the iteration of the first scan in which the first subframe is acquired.

5. The controller of claim 2, wherein execution of the instructions further causes the controller to:
   assemble the subframes acquired from the repeated iterations of the first scan to produce the frame of sensor data.

6. The controller of claim 2, wherein execution of the instructions for performing the first scan causes the controller to: drive the array of sensor electrodes with a plurality of patterns of sensing signals over the plurality of iterations of the first scan, respectively.

7. The controller of claim 6, wherein execution of the instructions further causes the controller to:
   acquire the second subframe of sensor data during a second scan of the array of sensor electrodes, wherein the second scan is performed prior to the first scan.

8. The controller of claim 7, wherein the second scan is also performed by driving the array of sensor electrodes with the plurality of patterns of sensing signals, and wherein the first and second subframes are associated with the same pattern of sensing signals.

9. The controller of claim 1, wherein execution of the instructions for performing the first scan causes the controller to:
   drive a sensing signal onto a different subset of rows in the array, in a raster order, during each iteration of the first scan.

10. The controller of claim 1, wherein execution of the instructions for performing the first scan causes the controller to:
    drive the array according to a different code-division multiplexing (CDM) block during each iteration of the first scan.

11. A method of capacitive sensing performed by an input device comprising: performing a first scan of an array of sensor electrodes over a plurality of iterations to acquire a frame of sensor data, wherein a different subframe of the sensor data is acquired from each iteration of the first scan; comparing, during each iteration of the first scan, the subframe of sensor data acquired from the iteration of the first scan with a respective subframe of sensor data acquired prior to the iteration of the first scan; and selectively repeating one or more iterations of the first scan based on the comparison.

12. The method of claim 11, wherein the selectively repeating of the one or more iterations of the first scan comprises: detecting, as a result of the comparison, a difference between a first subframe of sensor data acquired during the first scan and a second subframe of sensor data acquired prior to the acquisition of the first subframe; and repeating the one or more iterations of the first scan in response to detecting the difference between the first subframe and the second subframe.

13. The method of claim 12, wherein the one or more iterations of the first scan include the iteration in which the first subframe is acquired.

14. The method of claim 13, wherein the one or more iterations of the first scan further include one or more iterations immediately preceding the iteration of the first scan in which the first subframe is acquired.

15. The method of claim 12, further comprising:
    assembling the subframes acquired from the repeated iterations of the first scan to produce the frame of sensor data.

16. The method of claim 12, wherein the performing of the first scan comprises:
    driving the array of sensor electrodes with a plurality of patterns of sensing signals over the plurality of iterations, respectively.

17. The method of claim 16, further comprising:
    acquiring the second subframe of sensor data during a second scan of the array of sensor electrodes, wherein the second scan is performed prior to the first scan by driving the array of sensor electrodes with the plurality of patterns of sensing signals, and wherein the first and second subframes are associated with the same pattern of sensing signals.

18. The method of claim 11, wherein the performing of the first scan comprises:
    driving a sensing signal onto a different subset of rows in the array, in a raster order, during each iteration of the first scan.

19. The method of claim 11, wherein the performing of the first scan comprises:
    driving the array according to a different code-division multiplexing (CDM) block during each iteration of the first scan.

20. An input device comprising: an array of sensor electrodes configured for capacitive sensing in a sensing region of the input device; and a processing system configured to: perform a first scan of the array of sensor electrodes over a plurality of iterations to acquire a frame of sensor data, wherein a different subframe of the sensor data is acquired from each iteration of the first scan; compare, during each iteration of the first scan, the subframe of sensor data acquired from the iteration of the first scan with a respective subframe of sensor data acquired prior to the iteration of the first scan; and selectively repeat one or more iterations of the first scan based on the comparison.

* * * * *